(12) United States Patent
Noel et al.

(10) Patent No.: US 11,256,813 B2
(45) Date of Patent: Feb. 22, 2022

(54) SYSTEM VULNERABILITY MITIGATION

(71) Applicant: The Government of the United States, as represented by the Secretary of the Army, Washington, DC (US)

(72) Inventors: Patrick Noel, Waymart, PA (US); Brian Medwetz, Mountain Top, PA (US); Donna Askew, West Pittston, PA (US); John Kostiak, Jr., Avoca, PA (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 358 days.

(21) Appl. No.: 16/259,088

(22) Filed: Jan. 28, 2019

(65) Prior Publication Data

US 2020/0242253 A1    Jul. 30, 2020

(51) Int. Cl.
*G06F 21/57* (2013.01)
*G06F 16/9035* (2019.01)
*G06F 21/55* (2013.01)

(52) U.S. Cl.
CPC ........ *G06F 21/577* (2013.01); *G06F 16/9035* (2019.01); *G06F 21/554* (2013.01); *G06F 2221/034* (2013.01)

(58) Field of Classification Search
CPC .. G06F 21/577; G06F 16/9035; G06F 21/554; G06F 2221/034
See application file for complete search history.

(56) References Cited

U.S. PATENT DOCUMENTS

| | | | |
|---|---|---|---|
| 2010/0242114 A1* | 9/2010 | Bunker | G06F 21/577 726/25 |
| 2014/0245376 A1* | 8/2014 | Hibbert | H04L 63/20 726/1 |
| 2016/0232358 A1* | 8/2016 | Grieco | G06F 21/577 |
| 2017/0046519 A1* | 2/2017 | Cam | G06N 7/005 |
| 2018/0351987 A1* | 12/2018 | Patel | H04L 63/1433 |

* cited by examiner

*Primary Examiner* — Meng Li
(74) *Attorney, Agent, or Firm* — Ronald Krosky

(57) ABSTRACT

A profile can be created for a system indicating various attributes of the system. Based on these attributes, a set of security vulnerabilities can be identified. A mitigation function list can be determined that addresses at least part of the set of security vulnerabilities. The mitigation function list can be performed upon the system to mitigate at least part of the set of security vulnerabilities. A report can be generated identifying how the security vulnerabilities were mitigated and/or security vulnerabilities that still exist in the system.

15 Claims, 18 Drawing Sheets

SYSTEM VULNERABILITY MITIGATION

GOVERNMENT INTEREST

The innovation described herein may be manufactured, used, imported, sold, and licensed by or for the Government of the United States of America without the payment of any royalty thereon or therefor.

BACKGROUND

New systems can be created for a variety of reasons, such as to provide new functionality. Additionally, existing systems can be updated, such as being outfitted with new hardware and/or software. This updating can improve functionality as well as provide new functionality. However, a new system or updated system can also experience vulnerabilities.

SUMMARY

In one embodiment, a non-transitory computer-readable medium can store processor-executable instructions that when executed by a processor cause the processor to perform a method. The method can comprise accessing a profile for a system and performing a vulnerability assessment of the system based, at least in part, on the profile of the system. The method can also comprise identifying a mitigation task list for the system based, at least in part, on the vulnerability assessment and causing the mitigation task list to be performed upon the system. The method can additionally comprise evaluating the system post-causation of the mitigation task list upon the system to produce an evaluation result and causing output of a report based, at least in part, on the evaluation result. The report can indicate an overall success of mitigation.

In one embodiment, a non-transitory computer-readable medium, communicatively coupled to a processor, can be configured to store a command set executable by the processor to facilitate operation of a component set. The component set can comprise a first access component configured to access a first mitigation function that mitigates a first security vulnerability. The component set can also comprise a second access component configured to access a second mitigation function that mitigates a second security vulnerability. The first access component can be configured to access the first mitigation function when a system profile indicates a system suffers from the first security vulnerability. The second access component can be configured to access the second mitigation function when the system profile indicates the system suffers from the second security vulnerability.

In one embodiment, a processor, communicatively coupled to a non-transitory computer-readable medium, can be configured to execute a command set retained upon the non-transitory computer-readable medium to perform a method. The method can comprise performing a first vulnerability assessment on a first system based, at least in part, on a profile of the first system to produce a first vulnerability list and identifying a first mitigation task list for the first system based, at least in part, on the first vulnerability assessment. The method can additionally comprise causing the first mitigation task list to be performed upon the first system and evaluating the first system post-performance of the first mitigation task list to produce a first evaluation result. The method can also comprise causing output of a first report based, at least in part, on the first evaluation result and performing a second vulnerability assessment on a second system based, at least in part, on a profile of the second system to produce a second vulnerability list. In addition, the method can comprise identifying a second mitigation task list for the second system based, at least in part, on the second vulnerability assessment and causing the second mitigation task list to be performed upon the second system. Further, the method can comprise evaluating the second system post-performance of the second mitigation task list to produce a second evaluation result and causing output of a second report based, at least in part, on the second evaluation result. The first system and the second system can be separate and distinct systems, the first vulnerability list and the second vulnerability list can share a common vulnerability item, and the first mitigation task list and the second mitigation task list can share a common mitigation item to mitigate the common vulnerability item.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1A:
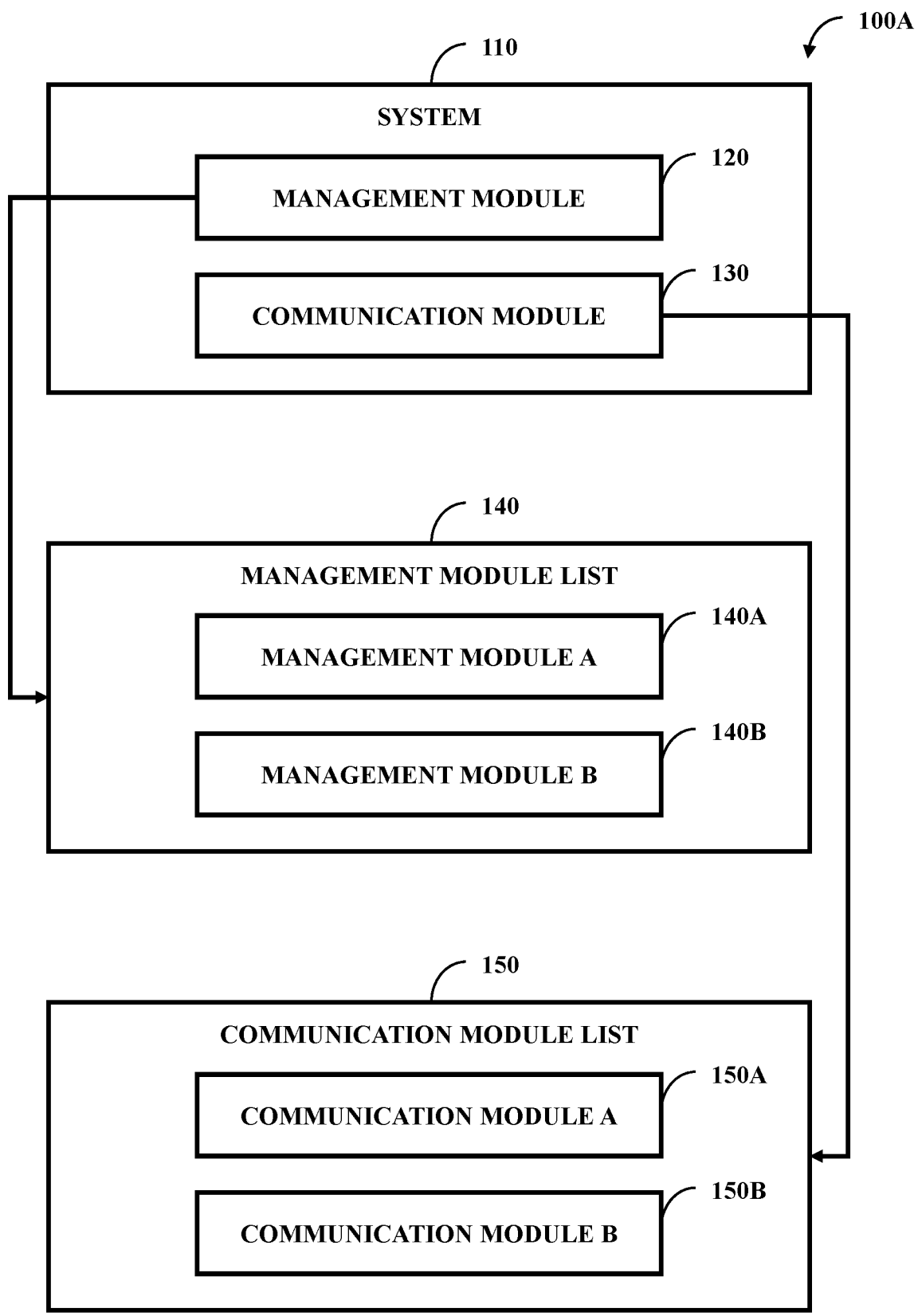
FIG. 1A illustrates one embodiment of an environment with a system comprising a management module and a communication module as well as a management module list and a communication module list.

When a new system is produced or a current system is updated, the system can have security vulnerabilities. In one example, addition of a new Internet browser on a computer can cause security vulnerabilities allowing unwanted access to the computer. A correction can be put into place to mitigate this vulnerability. Over time, a list of vulnerabilities and mitigations can be built up and saved in a database.

When a system is newly created or updated, the system can be subjected to an algorithm that proactively identifies and corrects vulnerabilities. While some vulnerabilities can be corrected, other may not be able to be corrected. A report can be generated identify what was corrected and what could not be corrected.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components. As an example, a first and second component described herein can be two separate components or simply a conceptual breakdown of a single component.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1A illustrates one embodiment of an environment 100A with a system 110 comprising a management module 120 and a communication module 130 as well as a management module list 140 and a communication module list 150. The system 110 is an example system that will be used through the specification. It comprises two modules, but it is to be appreciated that more or less complex systems can be used in conjunction with aspects disclosed herein (e.g., system will one-thousand different modules).

The system 110 can be a computer pre-installed with a management module 120 (e.g., operating system) and a communication module 130 (e.g., Internet browser). These modules perform functionality and have security vulnerabilities for the system 110. Depending on which module is included in the system 110, the functionality and vulnerabilities can be different.

In one embodiment, the system 110 can be subjected to an apparatus that proactively evaluates the system 110 or a technician can evaluate the system 110. This evaluation can identify the existence of the management module 120 and the communication module 130. Additionally, this evaluation can include identifying the details of the different modules in the system 110.

In one example, with the technician, a user interface presents a drop-down menu highlighting the management module list 140 and the communication module list 150. From this menu, the technician can enter information about the system 110. Two options for the management module 120 of the system 110 can be management module A 140A (e.g., a Windows-based operating system) and management module B 140B (e.g., Linux-based operating system)—both part of the management module list 140. Similarly, two options for the communication module 150 of the system 110 can be communication module A 150A (e.g., Firefox-based Internet browser) and communication module B 150B (e.g., Chrome-based Internet browser)—both part of the communication module list 150.

Figure 1B:
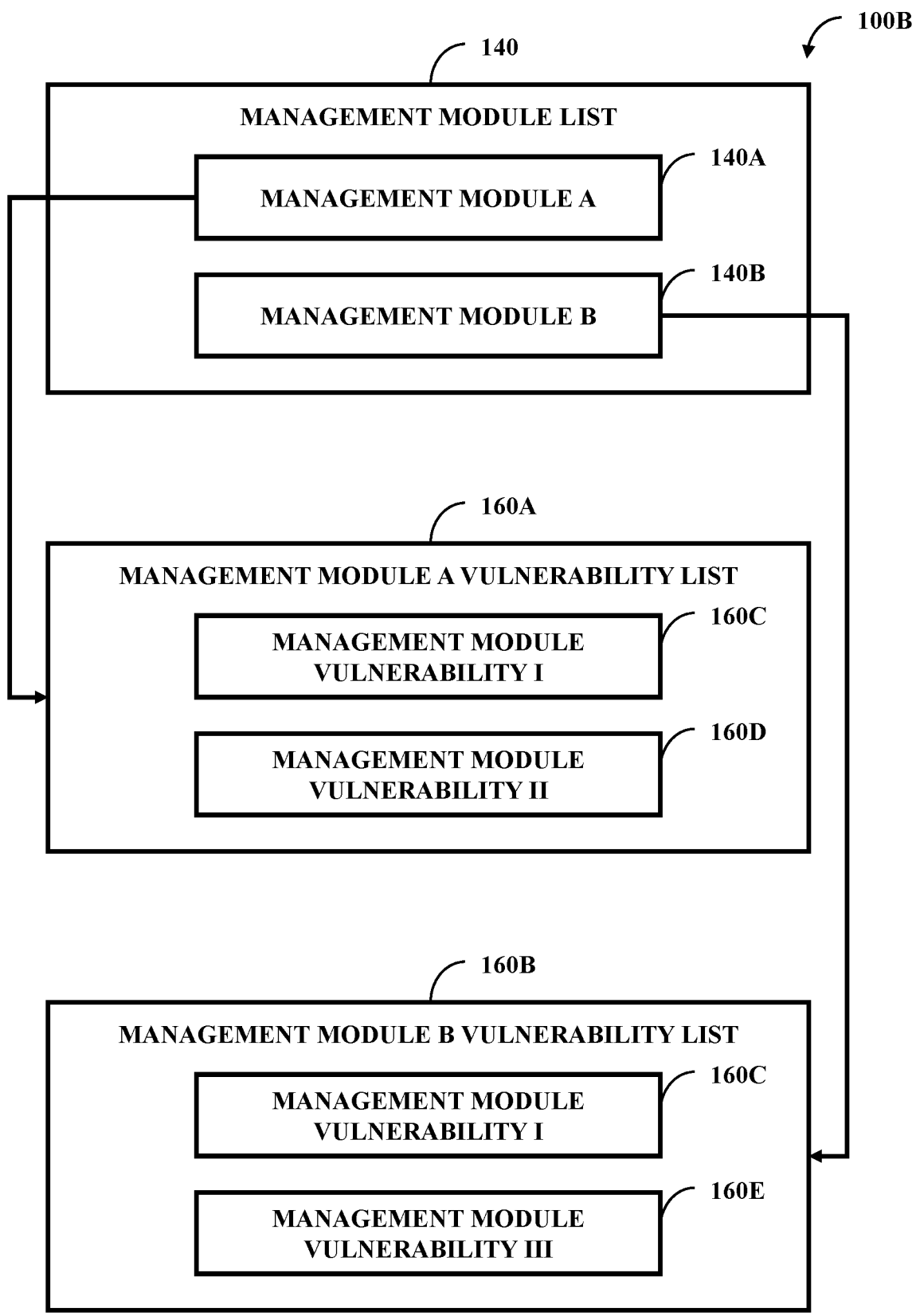
FIG. 1B illustrates one embodiment of an environment with the management module list, a management module A vulnerability list, and a management module B vulnerability list.
Figure 1C:
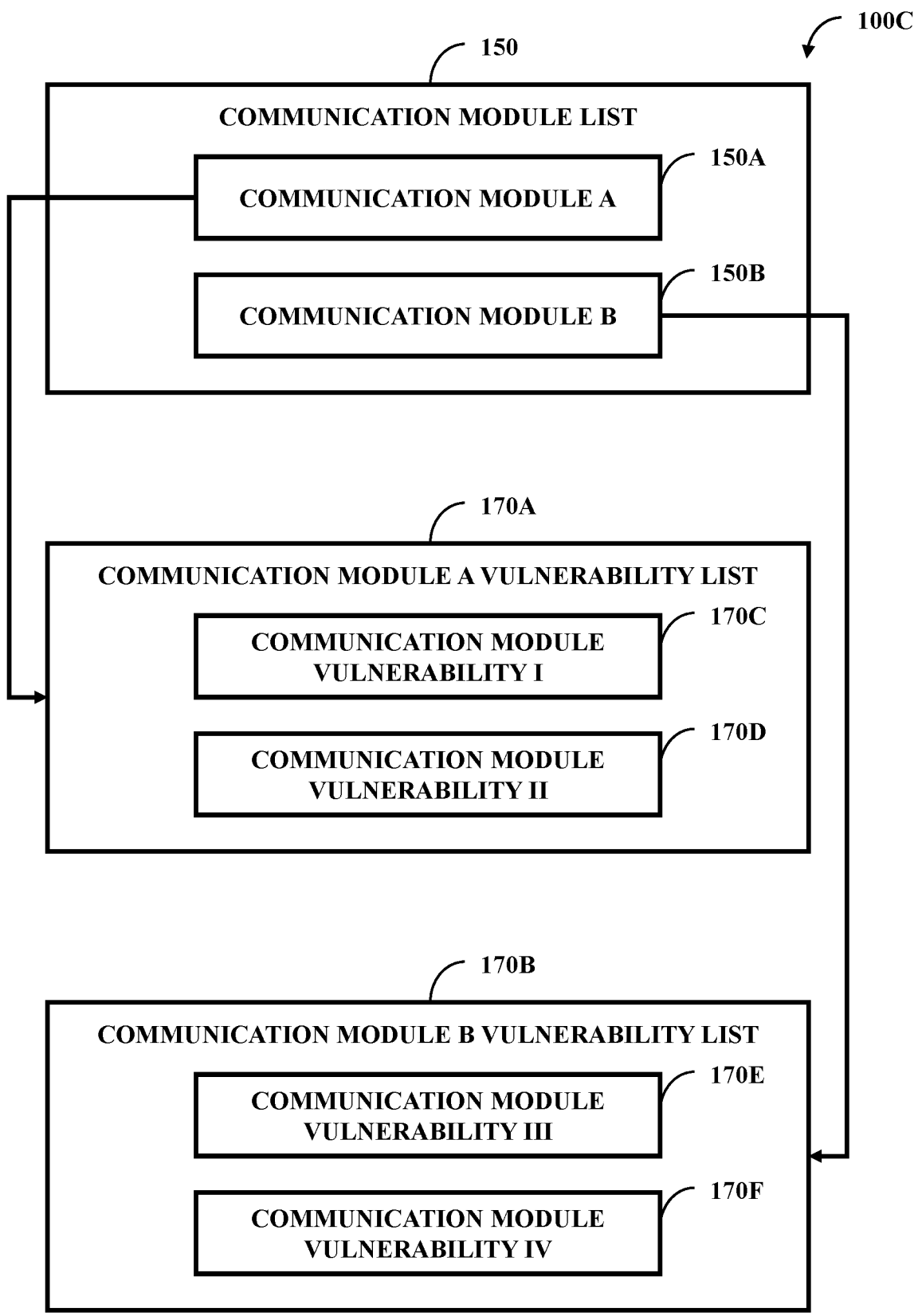
FIG. 1C illustrates one embodiment of an environment with the communication module list, a communication module A vulnerability list, and a communication module B vulnerability list.

FIG. 1B illustrates one embodiment of an environment 100B with the management module list 140, a management module A vulnerability list 160A, and a management module B vulnerability list 160B while FIG. 1C illustrates one embodiment of an environment 100C with the communication module list 150, a communication module A vulnerability list 170A, and a communication module B vulnerability list 170B. What modules are selected from the management module list 140 and the communication module list 150 dictate the vulnerabilities of the system 110. Returning to the user interface example, when the technician selects the appropriate module, vulnerabilities can be identified for the system 110. In one example, when management module A 140A is selected, then management module A vulnerability list 160A can be designated for the system 110, meaning the system 110 has management module vulnerability I 160C and management module vulnerability II 160D. Conversely, if management module B 140B is selected, then management module B vulnerability list 160B can be designated for the system 110, meaning the system 110 has management module vulnerability I 160C and management module vulnerability III 160E.

One thing to note from this is that the same vulnerability can exist with different modules. Here, both module lists have management module vulnerability I 160C. Also, different modules can have different vulnerabilities. As an example of this, management module A 140A is associated with management module vulnerability II 160D, but management module B 140B is not.

It is also possible for vulnerability lists to be completely exclusive of one another. Communication module A 150A can be associated with communication module A vulnerability list 170A that includes communication module vulnerability I 170C and communication module vulnerability II 170D. Communication module B 150B can be associated with communication module B vulnerability list 170B that includes communication module vulnerability III 170E and communication module vulnerability IV 170F. With this, the lists 170A and 170B do not share common vulnerabilities.

Figure 1D:
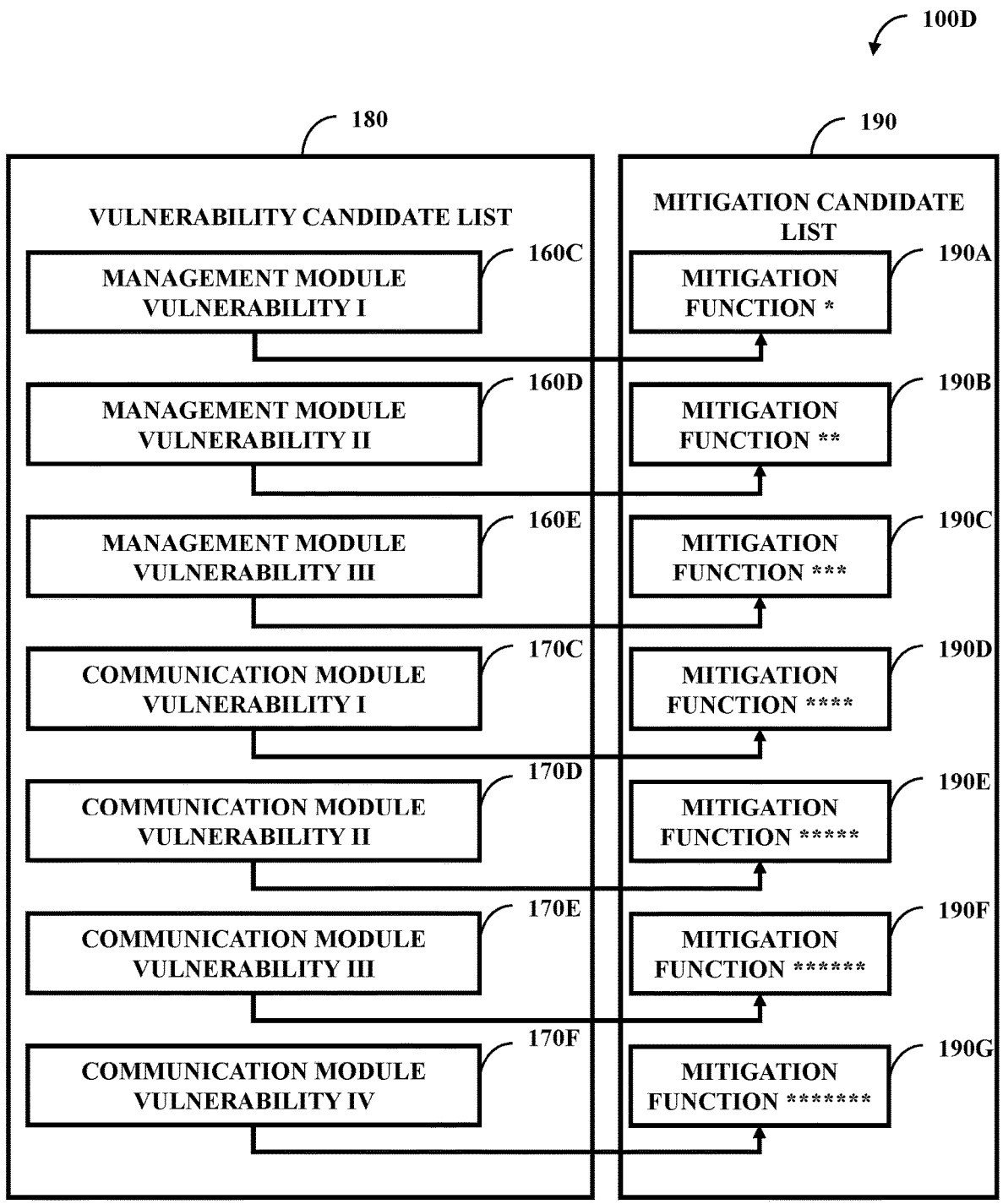
FIG. 1D illustrates one embodiment of an environment with a vulnerability candidate list and a mitigation candidate list.

FIG. 1D illustrates one embodiment of an environment 100D with a vulnerability candidate list 180 and a mitigation candidate list 190. The list 180 includes vulnerabilities 160C-160E and 170C-170F. These can individually be associated with various mitigation functions 190A-190G of the list 190. In the environment 100D, individual independent vulnerabilities associate with individual independent functions. However, other configurations can be practiced, such as one function being a mitigation for multiple vulnerabilities (e.g., function 190A mitigating vulnerabilities 160C and 160D) or an individual vulnerability being mitigatable by multiple functions (e.g., vulnerability 160C is mitigatable by functions 190A and 190B while vulnerability 160D is mitigatable by function 190B).

Figure 2A:
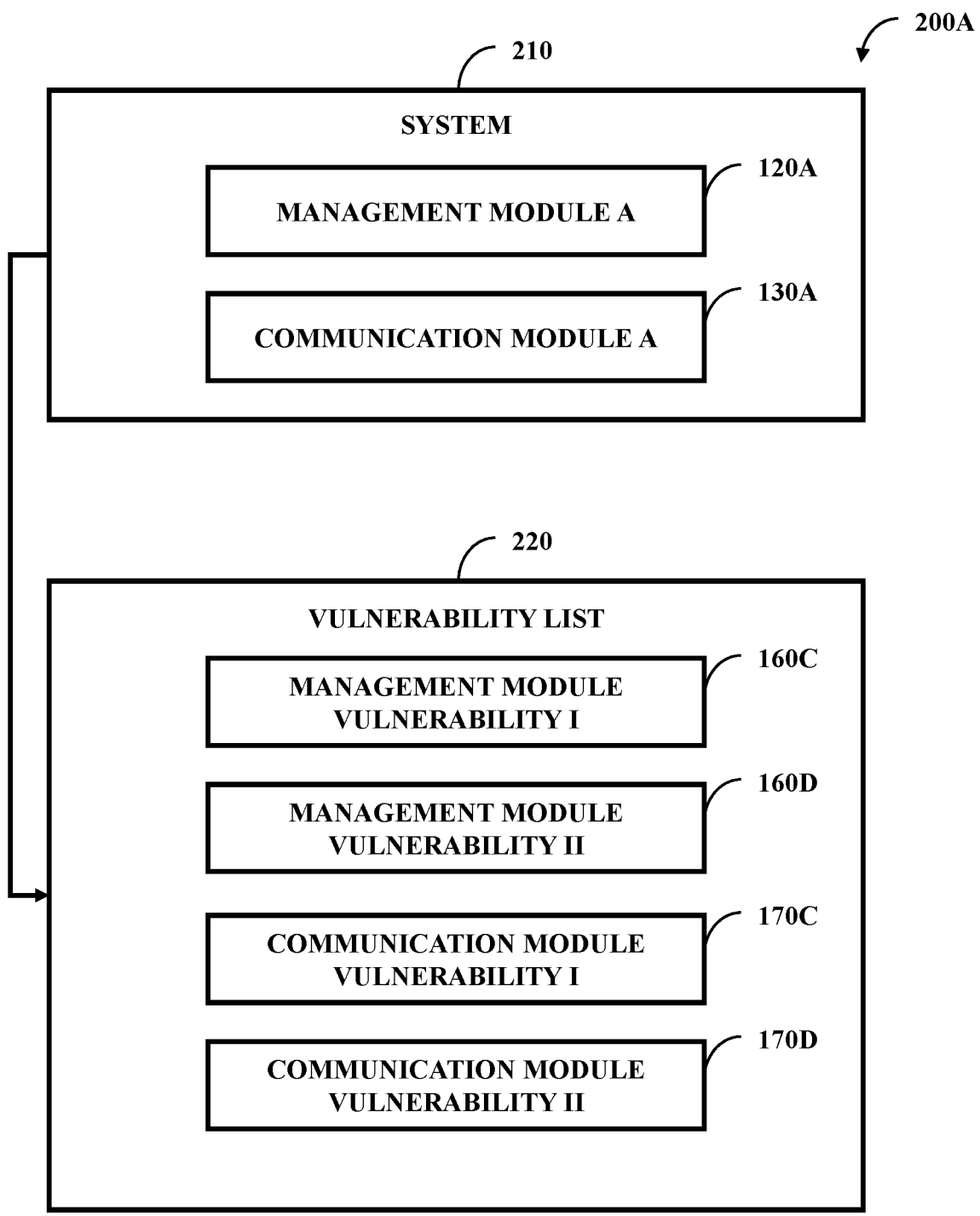
FIG. 2A illustrates one embodiment of an environment with a system and a vulnerability list.

FIG. 2A illustrates one embodiment of an environment 200A with a system 210 and a vulnerability list 220. The system 210 can be a specific implementation of the system 110 of FIG. 1. With this implantation, the system 210 includes management module A 120A (e.g., instead of management module B 120B of FIG. 1A) and the communication module 130A. Based on environments 100B and 100C of FIGS. 1B and 1C, the vulnerability list 220 of the system 210 includes management module vulnerability I 160C, management module vulnerability II 160D, communication module vulnerability I 170C, and communication module vulnerability II 170D.

Figure 2B:
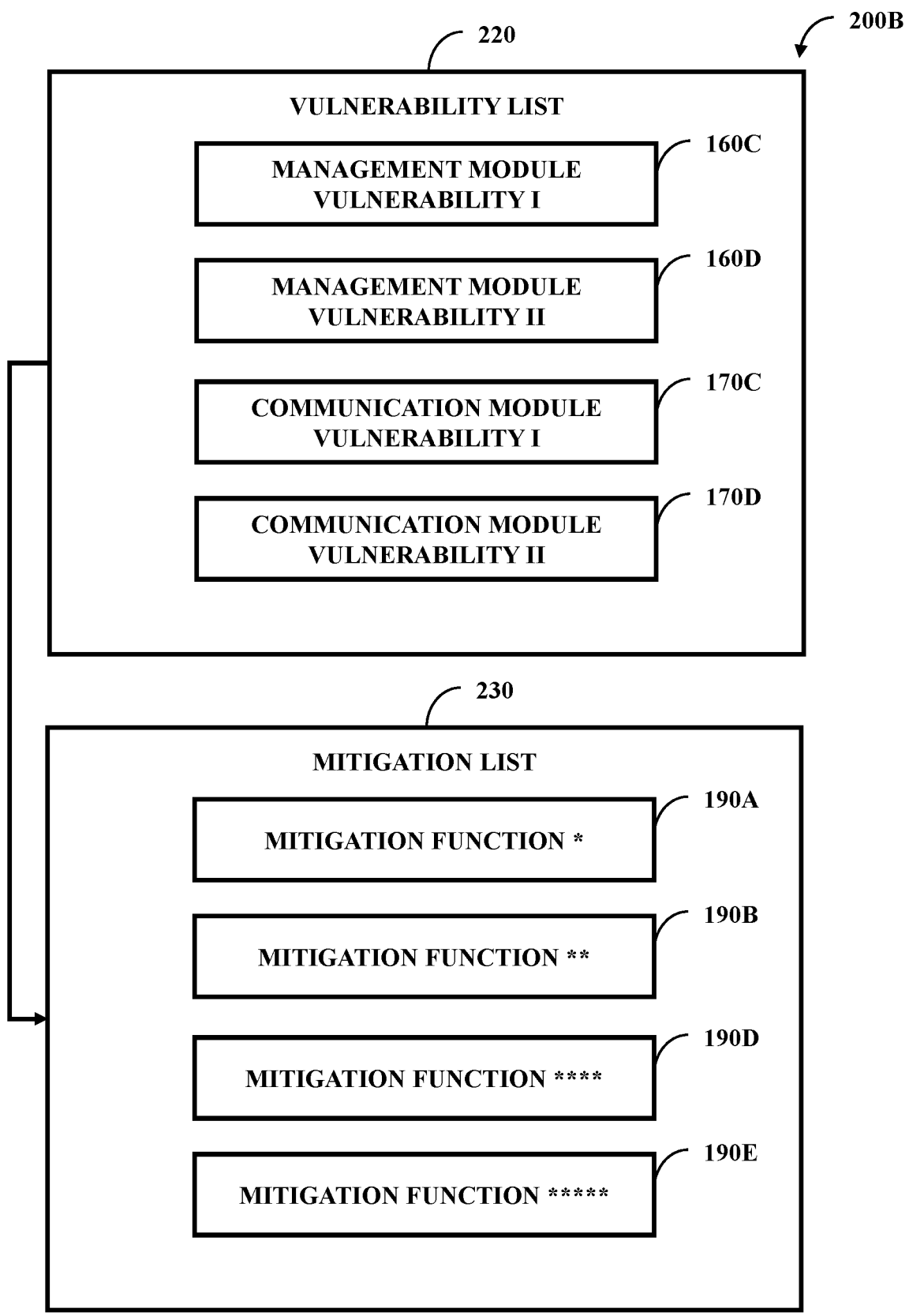
FIG. 2B illustrates one embodiment of an environment with the vulnerability list and a mitigation list.

FIG. 2B illustrates one embodiment of an environment 200B with the vulnerability list 220 with vulnerabilities 160C, 160D, 170C, and 170D and a mitigation list 230 with functions 190A, 190B, 190D, and 190E. To cure the vulnerabilities of the list 220, the mitigation list 220 can be populated (e.g., by a component, such as the same component that evaluates the system 210 to identify the modules and/or identifies the vulnerabilities to place them in the list 220). Based on the environment 100D of FIG. 1D, the mitigation list 230 includes the function 190A, the function 190B, the function 190D, and the function 190E.

Figure 3:
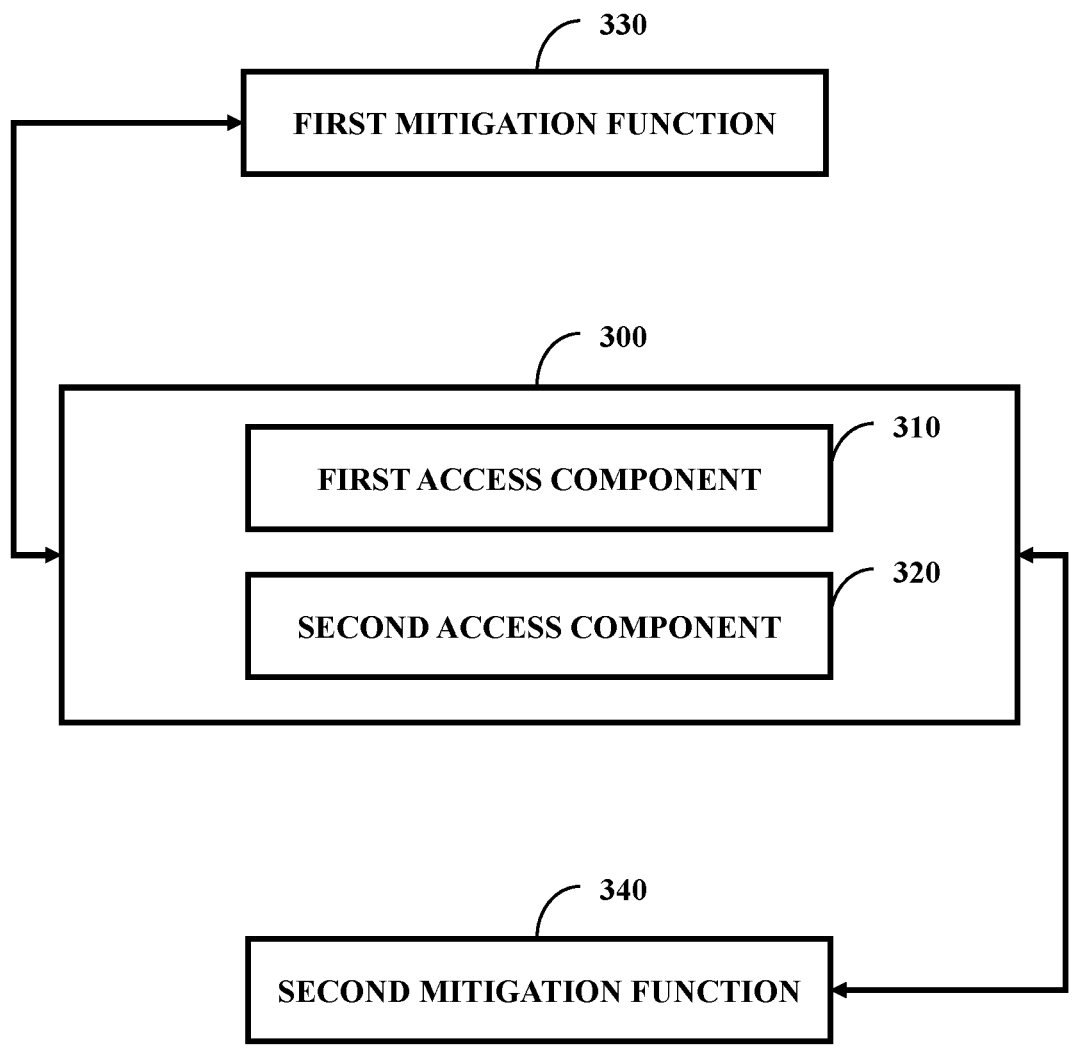
FIG. 3 illustrates one embodiment of a system comprising a first access component and a second access component.

FIG. 3 illustrates one embodiment of a system 300 comprising a first access component 310 and a second access component 320. The first access component 310 can be configured to access a first mitigation function 330 (e.g., function 190A of FIG. 2B) that mitigates a first security vulnerability (e.g., vulnerability 160C of FIG. 2B). The second access component 320 can be configured to access a second mitigation function 340 (e.g., function 190B of FIG. 2B) that mitigates a second security vulnerability (e.g., vulnerability 160D of FIG. 2B). The first access component 310 can be configured to access the first mitigation function 3310 when a system profile indicates a system (e.g., the system 210 of FIG. 2A) suffers from the first security vulnerability. The second access component 320 can be configured to access the second mitigation function 240 when the system profile indicates the system suffers from the second security vulnerability.

Figure 4:
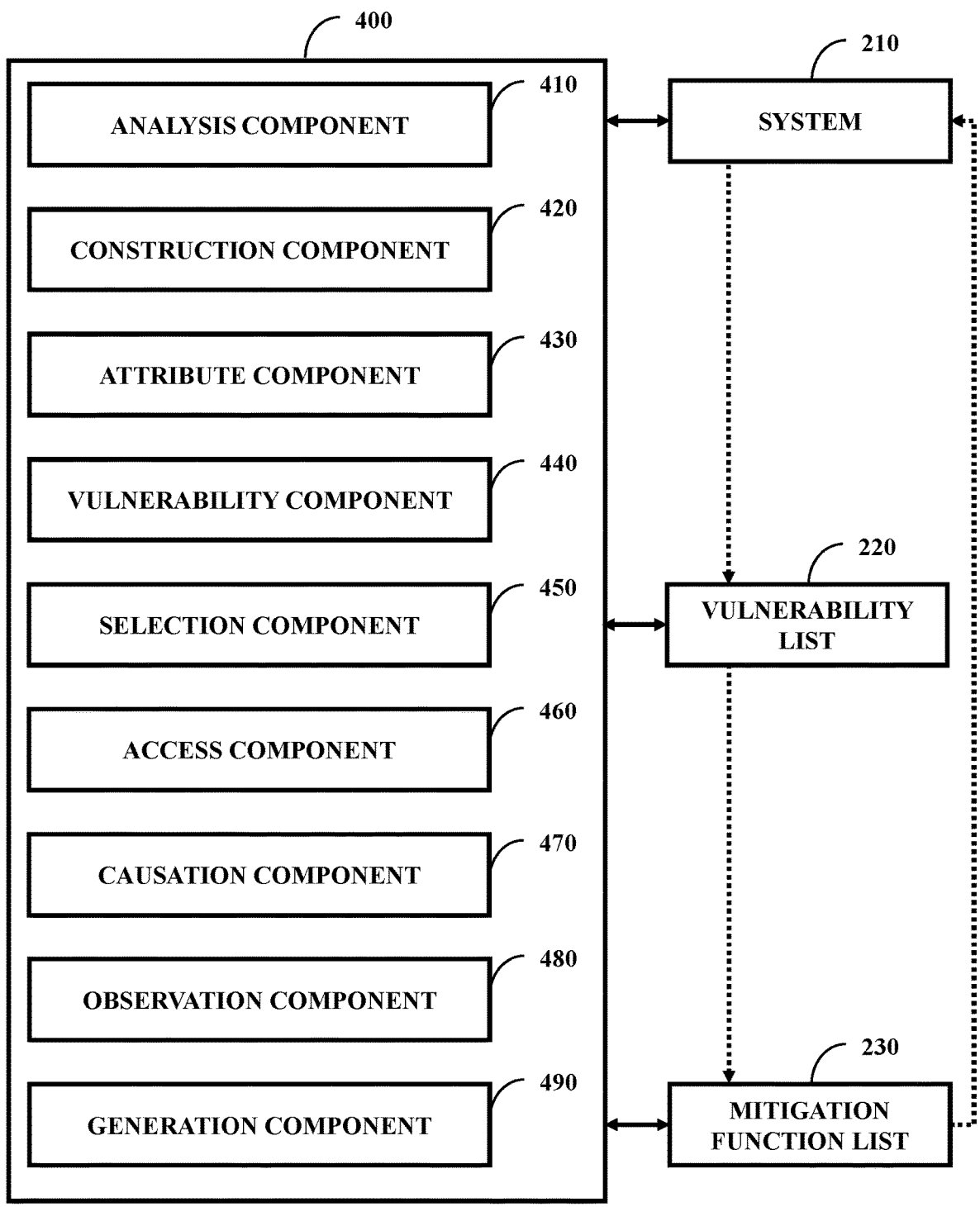
FIG. 4 illustrates one embodiment of an apparatus comprising an analysis component, a construction component, an attribute component, a vulnerability component, a selection component, an access component, a causation component, an observation component, and a generation component.

FIG. 4 illustrates one embodiment of an apparatus comprising an analysis component 410, a construction component 420, an attribute component 430, a vulnerability component 440, a selection component 450, an access component 460, a causation component 470, an observation component 480, and a generation component 490. The analysis component 410 can be configured to analyze the system 210 to produce an analysis result. The construction component 420 can be configured to construct a system profile based, at least in part, on the analysis result. The system profile can indicate the attributes of the system 210, such as the modules that are part of the system 210—management module A 120A of FIG. 2A and management module B 120B of FIG. 2A.

The attribute component 430 can be configured to identify an attribute list of the system 210 indicated by the system profile. This attribute list can be the list of modules of the system 210. In one embodiment, the attribute component 430 reads the system profile to identify the modules.

The vulnerability component 440 can be configured to identify the vulnerability list 220 associated with the attribute list. With the system 210, this can be practiced in view of the environment 200A of FIG. 2A—the list 220 is the individual vulnerabilities (160C, 160D, 170C, and 170D all of FIG. 2A) for the system 210. In one embodiment, the vulnerability component 440 accesses a database with a look-up table. This look-up table can correspond individual modules with a set of known vulnerabilities. The vulnerability component 440 can select the known vulnerabilities corresponding to the appropriate individual modules as the vulnerability list 220.

The selection component 450 can be configured to select the mitigation function list 230 based, at least in part, on the vulnerability list 220. With the system 210, this can be practiced in view of the environment 200B of FIG. 2B—the list 220 corresponds to the individual mitigation functions (190A, 190B, 190D, and 190E all of FIG. 2B) for the system 210. In one embodiment, the look-up table can also correspond individual vulnerabilities with a set of know mitigation functions. The selection component 450 can select the known mitigation functions as the mitigation function list 230.

The access component 460 can be a combination of the first access component 310 of FIG. 3 and the second access component 320 of FIG. 3. With this, the access component 460 can access mitigation functions indicated on the mitigation function list 230. In one embodiments, individual mitigation functions can be computer code (e.g., scripts) run on the system 210 to mitigate the individual vulnerabilities.

The causation component 470 can cause the system 210 to be subjected to the mitigation function(s) indicated by the mitigation function list 230. In one example, the vulnerability list 220 comprises two security vulnerabilities and the mitigation function list 230 comprises two mitigation functions. The causation component 470 (e.g., functioning as a first causation component) can be configured to cause the system 210 to be subjected to the first mitigation function 330 of FIG. 1 when the system profile indicates that the system 210 suffers from the first security vulnerability. The causation component 470 (e.g., functioning as a second causation component) can be configured to cause the system 210 to be subjected to the second mitigation function 340 of FIG. 3 when the system profile indicates that the system 210 suffers from the second security vulnerability. The causation component 470 can cause the system 210 to be subjected to these functions by running the scripts on the system 210.

The observation component 480 (e.g., a first observation component) can be configured to observe the system 210 being subjected to the first mitigation function 330 of FIG. 3 (e.g., function 190A of FIG. 2B) to produce a first observation result. The observation component 480 (e.g., a second observation component) can be configured to observe the system 210 being subjected to the second mitigation function 340 of FIG. 3 (e.g., function 190B of FIG. 2B) to produce a second observation result. This can continue with other mitigation functions when applicable (e.g., functions 190D and 190E of FIG. 2B).

The generation component 490 can be configured to generate a mitigation success/failure report. This report can be based, at least in part, on the first observation result and the second observation result. The generation component 490 can output the report (e.g., displayed on a screen, sent to a repository, or populated into a log).

Consider the following example. A personal computer can be a first system. The personal computer can run a specific Internet browser. After use, a security vulnerability with the specific Internet browser can be identified and a computer coder can write a patch as a mitigation function to cure this security vulnerability. A tablet can be a second system. The tablet can run the specific Internet browser. The tablet can be subjected to the apparatus 400 that identifies the Internet browser, identifies the security vulnerability, identifies the patch, and then applies the patch. With the patch, the tablet can be tested and if successful, then the tablet can be deployed with a report generated and outputted.

Figure 5:
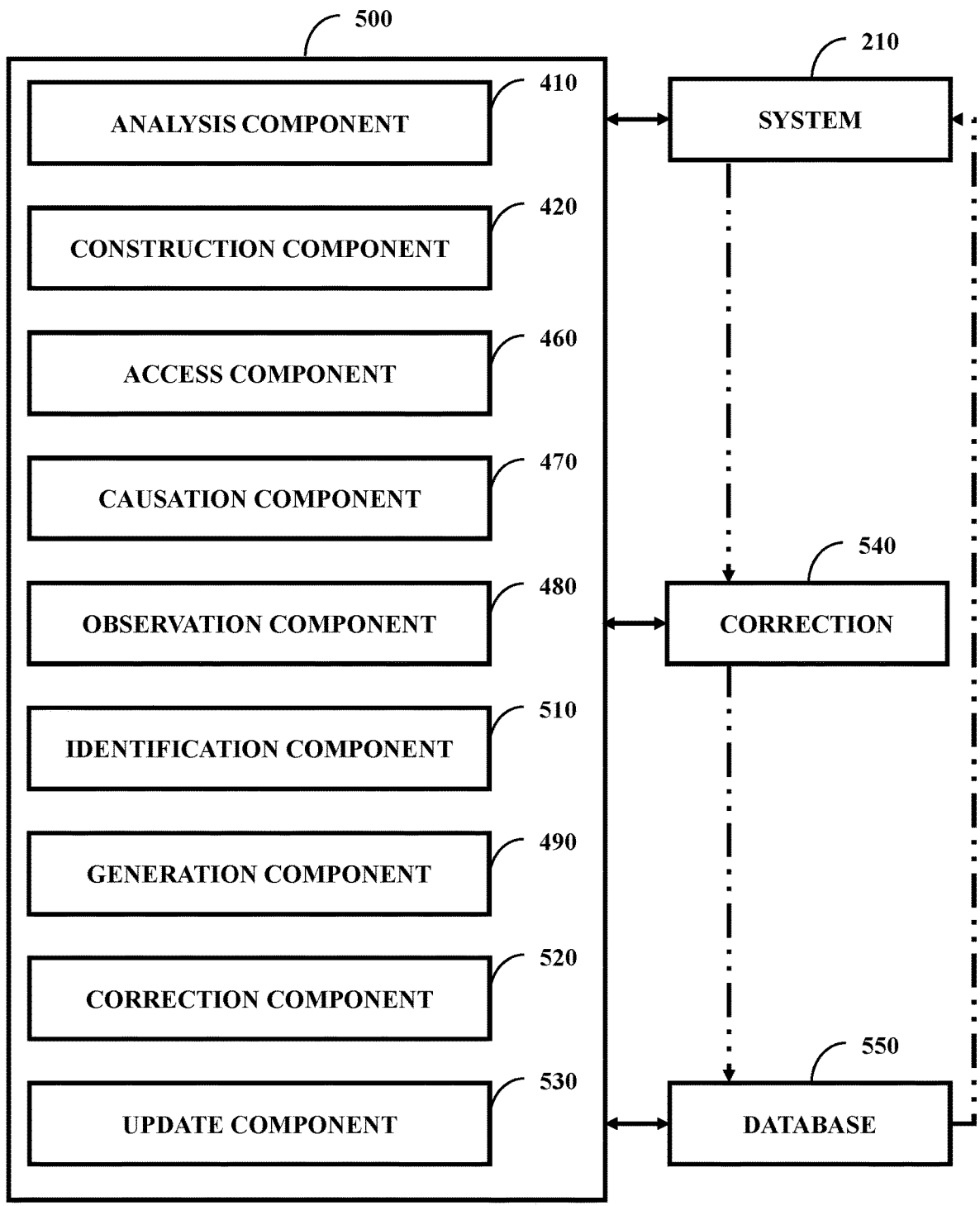
FIG. 5 illustrates one embodiment of an apparatus comprising the analysis component, the construction component, the access component, the causation component, the observation component, an identification component, the generation component, a correction component, and an update component.

FIG. 5 illustrates one embodiment of an apparatus 500 comprising the analysis component 410, the construction component 420, the access component 460, the causation component 470, the observation component 480, an identification component 510, the generation component 490, a correction component 520, and an update component 530. While mitigation functions can be successful (e.g., success defined as curing a vulnerability while system functionality is retained), failure can also occur. In one example, when mitigation failure occurs (e.g., the vulnerability is fixed, but functionality is prevented), the mitigation function can be undone (e.g., by the causation component 470) and the system 210 can be deployed without mitigation (e.g., the security vulnerability continues) or can be deployed without the vulnerable functionality.

The identification component 510 can be configured to identify a mitigation failure (or lack thereof) based, at least in part, on the first observation result and the second observation result. In one embodiment, the causation component 470, the observation component 480, and the identification component 510 work in conjunction to apply a mitigation function and test how the system 210 functions with the mitigation result. The generation component 490 can output the report indicating the existence of the mitigation failure (or lack thereof) as well as details about the mitigation failure (e.g., ascertained by the identification component 510), such as what failed and what the apparatus 500 did as a result (e.g., allow functionality without mitigation).

The correction component 520 can be configured to create a correction 540 (e.g., new mitigation function) for the mitigation failure. In one example, the correction component 520 can proactively (e.g., automatically) create a second script for the vulnerability that allows for functionality without vulnerability. The update component 530 can be configured to update a database 550 (e.g., same database with the look-up table) with the correction 540. The access component 460 can be configured to access the correction 540 as well as other mitigation functions from the database 550.

Returning to the personal computer/tablet example discussed with regard to FIG. 4, a smartphone can be subjected to the apparatus 500. While the patch can work for the personal computer and the tablet, the patch may not work for the smartphone. As an example, the patch can fix the vulnerability, but also block the ability to use the Internet browser on the smartphone. The apparatus 500 can have logic undoing the patch so a user can use the smartphone Internet browser and the apparatus 500 can produce a report. Based on this report, the update component 530 or the coder can craft a specific mitigation function for the smartphone that cures the vulnerability and allows for the functionality. The database 550 can be updated with this specific mitigation function that functions as the correction.

In one example, a wearable device, such as a smartwatch, can be subjected to the apparatus 500. The smartwatch can have a vulnerability not before seen by the apparatus 500 and therefore the vulnerability has no mitigation function. This can be reported and the update component 530 can cause a mitigation function to be created as the correction 540. The correction 540 can be populated into the database 550 and the database 550 (e.g., a distributed database) can be accessible by other similar apparatuses that can use the correction 540 in their own mitigation correction.

Figure 6:
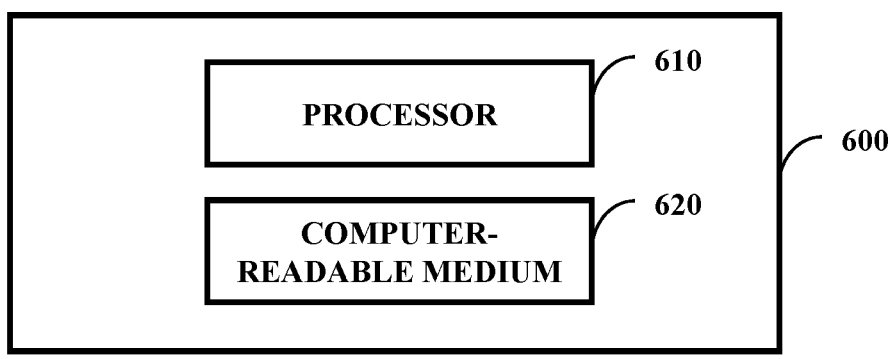
FIG. 6 illustrates one embodiment of an apparatus comprising a processor and a computer-readable medium.

FIG. 6 illustrates one embodiment of an apparatus 600 (e.g., a system) comprising a processor 610 and a computer-readable medium 620 (e.g., non-transitory computer-readable medium). In one embodiment, the computer-readable medium 620 is communicatively coupled to the processor 610 and stores a command set executable by the processor 610 to facilitate operation of at least one component disclosed herein (e.g., the access component 460 of FIG. 4). In one embodiment, at least one component disclosed herein (e.g., the controller component discussed in the previous paragraph) can be implemented, at least in part, by way of non-software, such as implemented as hardware by way of the apparatus 600. In one embodiment, the computer-readable medium 620 is configured to store processor-executable instructions that when executed by the processor 610, cause the processor 610 to perform at least part of a method disclosed herein (e.g., at least part of one of the methods 700-1000 discussed below) and as such the processor 610 can be configured to execute a command set retained upon the computer-readable medium 620 to perform a method disclosed herein.

Figure 7:
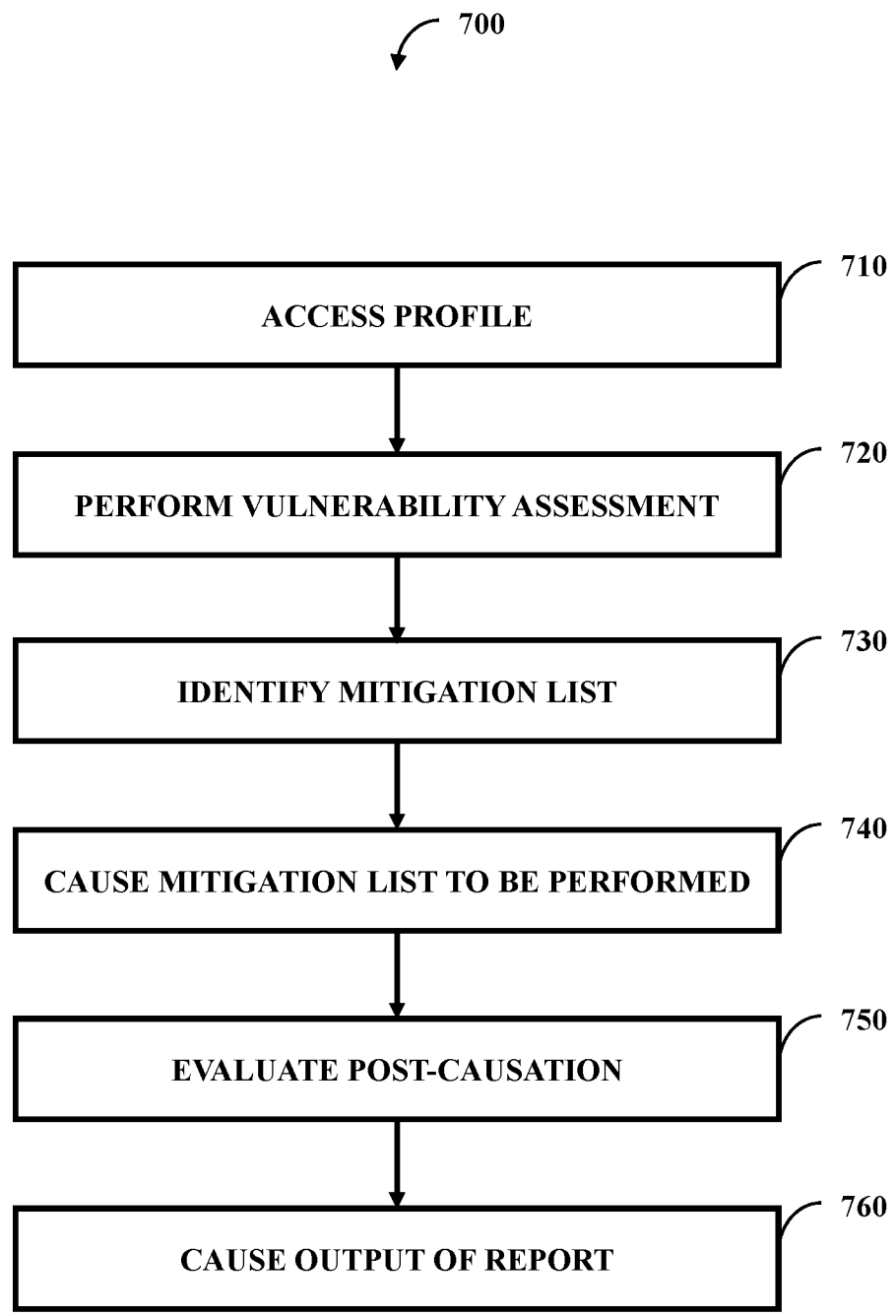
FIG. 7 illustrates one embodiment of a method comprising six actions.

FIG. 7 illustrates one embodiment of a method 700 comprising six actions 710-760. At 710, a profile for a system (e.g., the system 210 of FIG. 2A) can be accessed (e.g., created or contacted). This can include evaluating the system to produce an evaluation result and creating the profile based, at least in part, on the evaluation result.

At 720, performing a vulnerability assessment of the system can take place. The vulnerability assessment can be based, at least in part, on the profile of the system. An example of this can include identifying an attribute list of the system included in the profile and identifying a vulnerability list associated with the attribute list.

At 730, identifying a mitigation task list for the system can take place. This identification can be based, at least in part, on the vulnerability assessment. An example of this can include accessing a database that associates individual vulnerabilities with individual mitigation tasks and searching the database to determine the mitigation task list associated with the vulnerability list.

At 740, there can be causing the mitigation task list to be performed upon the system. At 750, evaluating the system post-causation of the mitigation task list upon the system can occur. This evaluation can produce an evaluation result. At 760, there can be causing output of a report based, at least in part, on the evaluation result (e.g., the report is generated based on the evaluation result and sent to a designated location). The report can indicate overall success of the mitigation, including detailing mitigation success and/or failure from causation of the mitigation task list upon the system.

Figure 8:
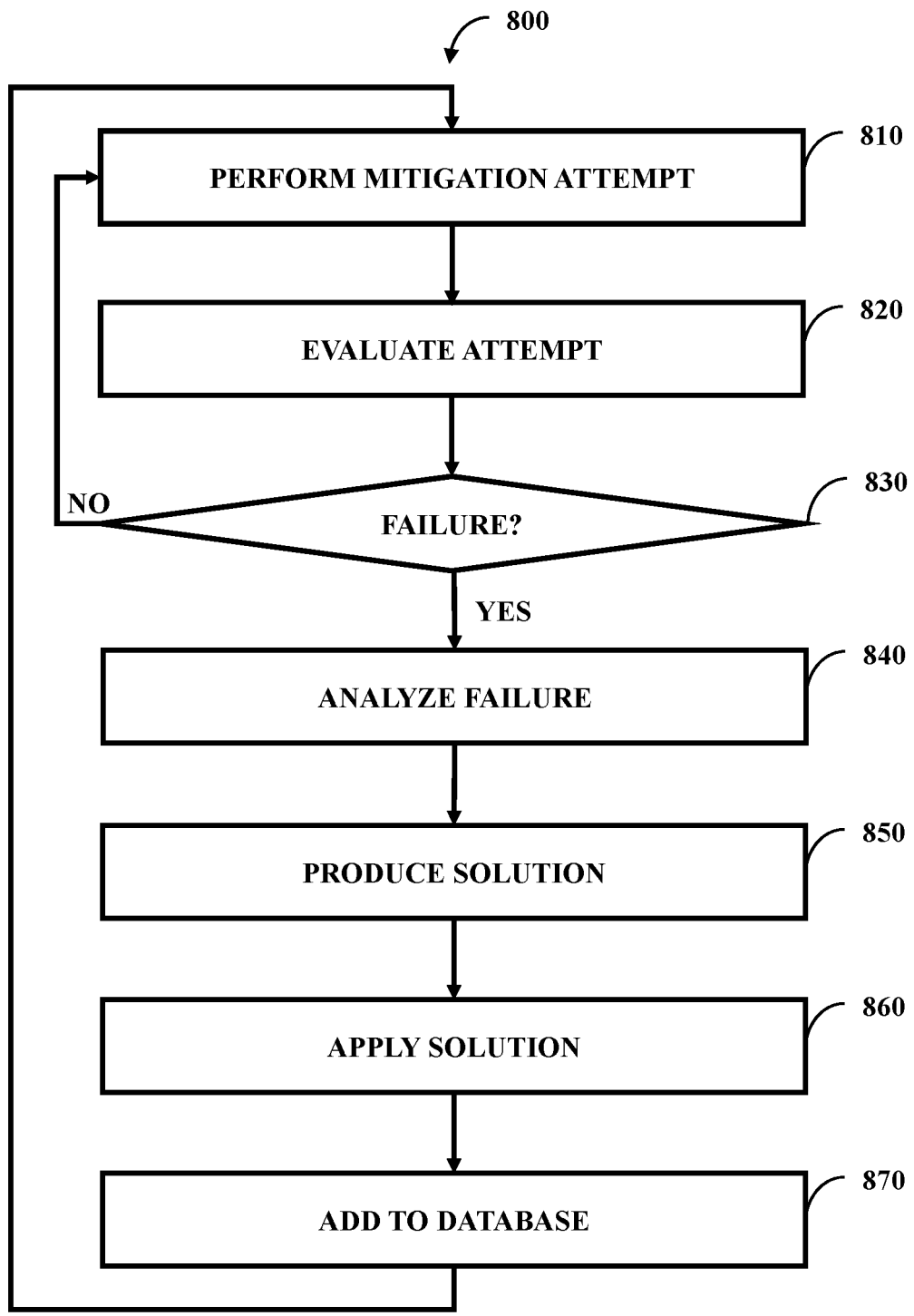
FIG. 8 illustrates one embodiment of a method comprising seven actions.

FIG. 8 illustrates one embodiment of a method 800 comprising seven actions 810-870. At 810, there can be performance of a mitigation attempt. Example actions that can be part of performing the mitigation attempt at 810 can include actions 710-740 of FIG. 7.

At 820, the attempt can be evaluated (e.g., action 750 of FIG. 7). A check can occur at 830 to determine if the mitigation attempt failed (e.g., a vulnerability exists or is correctable with an unacceptable loss of functionality). If the mitigation attempt does not fail, then the method 800 can return to action 810 to perform a mitigation attempt on another system.

If the mitigation attempt does fail (e.g., partially fails), then the method 800 can progress to action 840 where analyzing the mitigation failure can take place. This analysis can produce an analysis result that indicates why the failure occurred. At 850, there can be producing a solution of the mitigation failure based, at least in part, on the analysis result. At 860, the produced solution can be applied to the system—here a first system. The solution, at 870, can be added to a database that associates individual vulnerabilities with individual mitigation tasks (e.g., the database 550 of FIG. 5). The method 800 can return to action 810.

When returned to action 810, the action 810 can function upon a second system (e.g., another edition of the first system or a system different from the first system). As part of the action 810, there can be performing a second vulnerability assessment of the second system based, at least in part, on a profile of the second system. The action 810 can also include identifying a second mitigation task list for the second system based, at least in part, on the second vulnerability assessment as well as causing the second mitigation task list to be performed upon the second system. The second mitigation task list can include the solution. Therefore, the second system can have the benefit of the solution not initially available to the first system.

Figure 9:
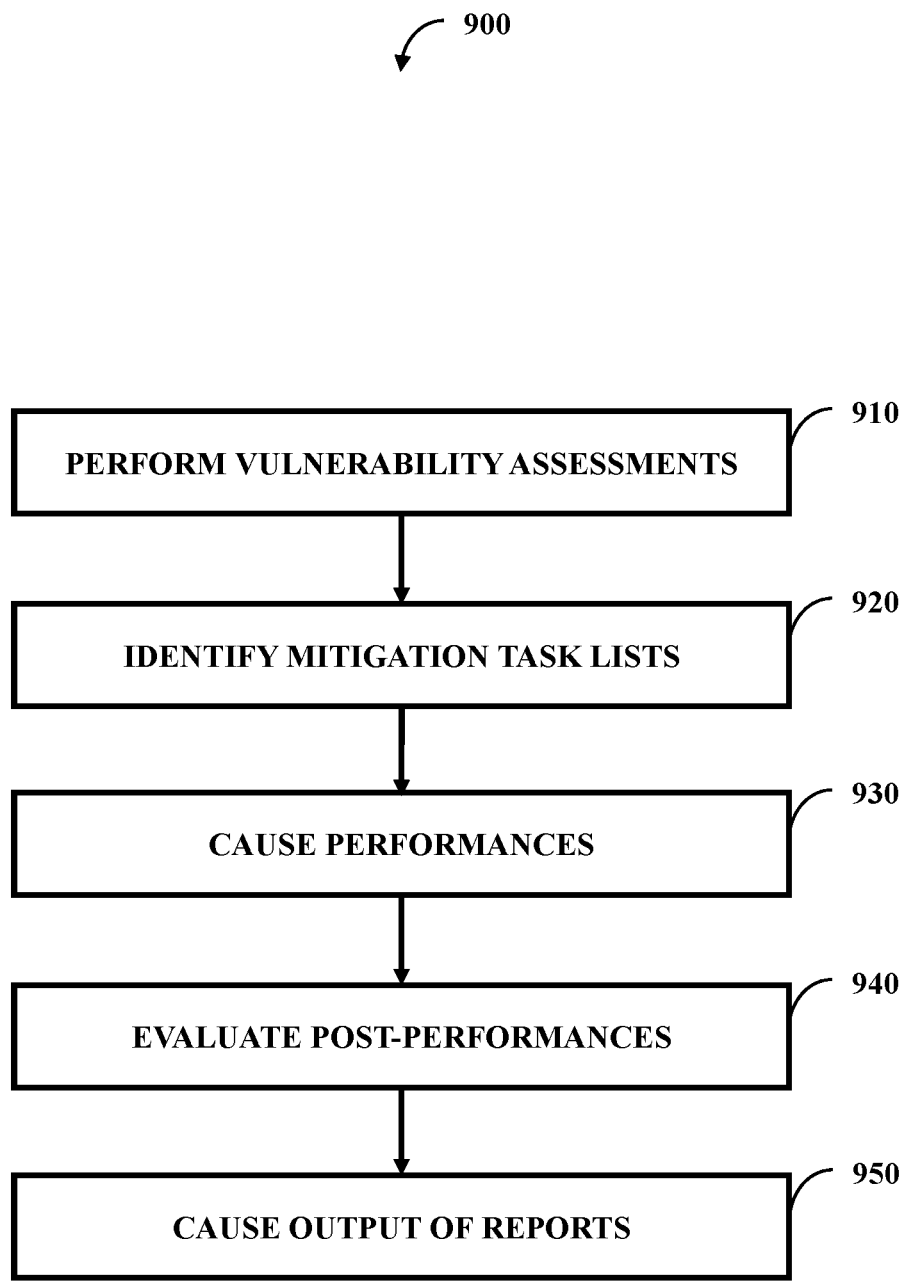
FIG. 9 illustrates one embodiment of a method comprising five actions.

FIG. 9 illustrates one embodiment of a method 900 comprising five actions 910-950. Performing a first vulnerability assessment on a first system based, at least in part, on a profile of the first system to produce a first vulnerability list as well as performing a second vulnerability assessment on a second system based, at least in part, on a profile of the second system to produce a second vulnerability list can occur at 910. The first system and the second system can be separate and distinct systems. The action 910 can include assessing attributes of the first system to produce a first assessment result and creating the profile of the first system based, at least in part, on the first assessment result. The action 910 can also include assessing attributes of the second system to produce a second assessment result and creating the profile of the second system based, at least in part, on the second assessment result.

At 920, there can be identifying a first mitigation task list for the first system based, at least in part, on the first vulnerability assessment and identifying a second mitigation task list for the second system based, at least in part, on the second vulnerability assessment. Action 920 can include searching, in view of the first vulnerability assessment, a database that associates individual vulnerabilities with individual mitigation tasks to identify the first mitigation task list. The action 920 can also include searching, in view of the second vulnerability assessment, the database that associates individual vulnerabilities with individual mitigation tasks to identify the second mitigation task list.

At 930, there can be causing the first mitigation task list to be performed upon the first system and causing the second mitigation task list to be performed upon the second system. At 940, evaluating the first system post-performance of the first mitigation task list to produce a first evaluation result and evaluating the second system post-performance of the second mitigation task list to produce a second evaluation result can take place. At 950, there can be causing output of a first report based, at least in part, on the first evaluation result and causing output of a second report based, at least in part, on the second evaluation result.

In one embodiment, at action 950 there can also be analyzing the first report to produce an analysis result that indicates a particular vulnerability item that is not successfully mitigated as a result of the first mitigation task list as well as producing a solution for the particular vulnerability item based, at least in part, on the analysis result. The second vulnerability assessment can comprise the particular vulnerability item and the second mitigation task list can comprise the solution. The second report can indicate the particular vulnerability item being mitigated for the second system.

The first vulnerability list and the second vulnerability list can share a common vulnerability item. The first mitigation task list and the second mitigation task list can share a common mitigation item to mitigate the common vulnerability item. However, the first vulnerability list can comprise a vulnerability item not found in the second vulnerability list and the second vulnerability list can comprise a vulnerability item not found in the first vulnerability list. In turn, the first mitigation task list can comprise a mitigation item not found in the second mitigation task list and the second mitigation task list can comprise a mitigation item not found in the first mitigation task list.

In one embodiment. performing the first vulnerability assessment, identifying the first mitigation task list, causing the first mitigation task list to be performed, evaluating the first system post-performance, and causing output of the first report can occur within a first time span. Meanwhile, performing the second vulnerability assessment, identifying the second mitigation task list, causing the second mitigation task list to be performed, evaluating the second system post-performance, and causing output of the second report can occur within a second time span. In example embodiments, the second time span follows the first time span with the first time span and the second time span not overlapping, the time spans can partially overlap, or be the time spans can be identical. In one example, the first time span and the second time span can start at the same time, but end at different times due to the length of time it takes to run the method 900 for the first and second system.

Figure 10A:
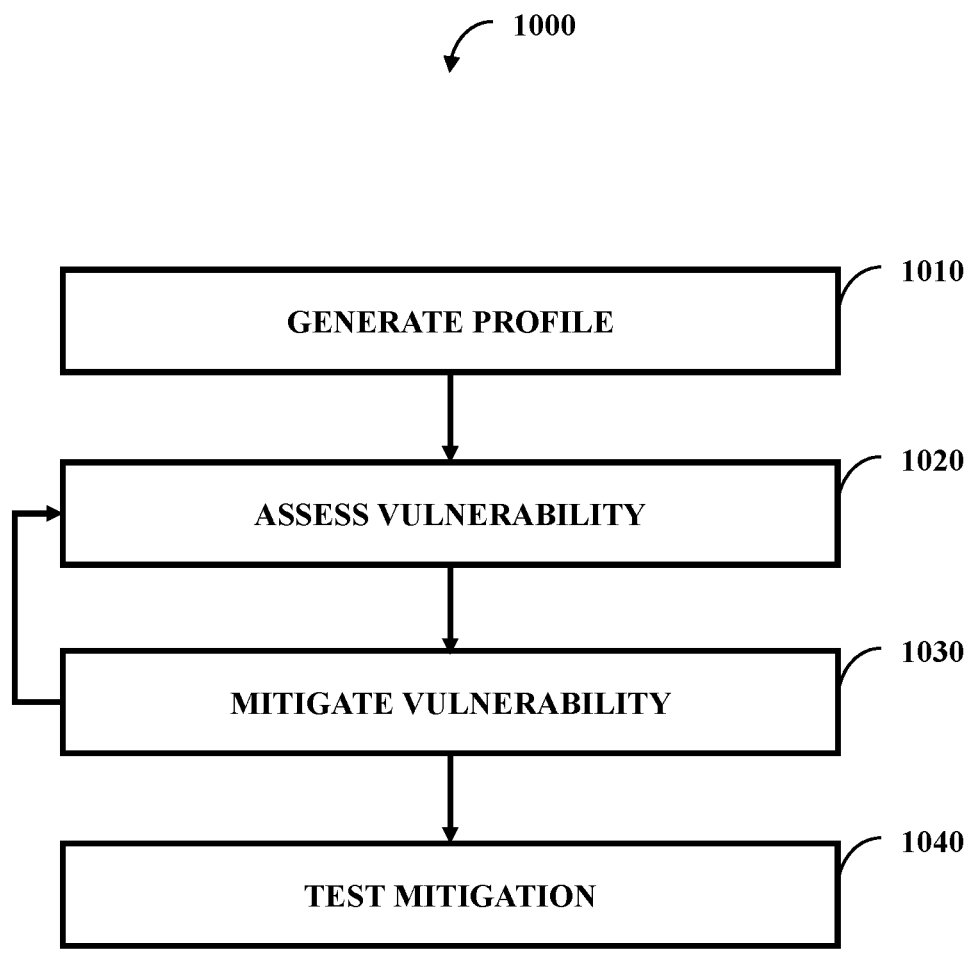
FIG. 10A illustrates one embodiment of a method comprising four actions—a first action, a second action, a third action, and a fourth action.

FIG. 10A illustrates one embodiment of a method 1000 comprising four actions 1010-1040. The method 1000 can allow for computer systems to be profiled, assessed, mitigated, and tested with at least some proactive assistance (e.g., profiling, assessing mitigating, and testing are completely automated).

Figure 10B:
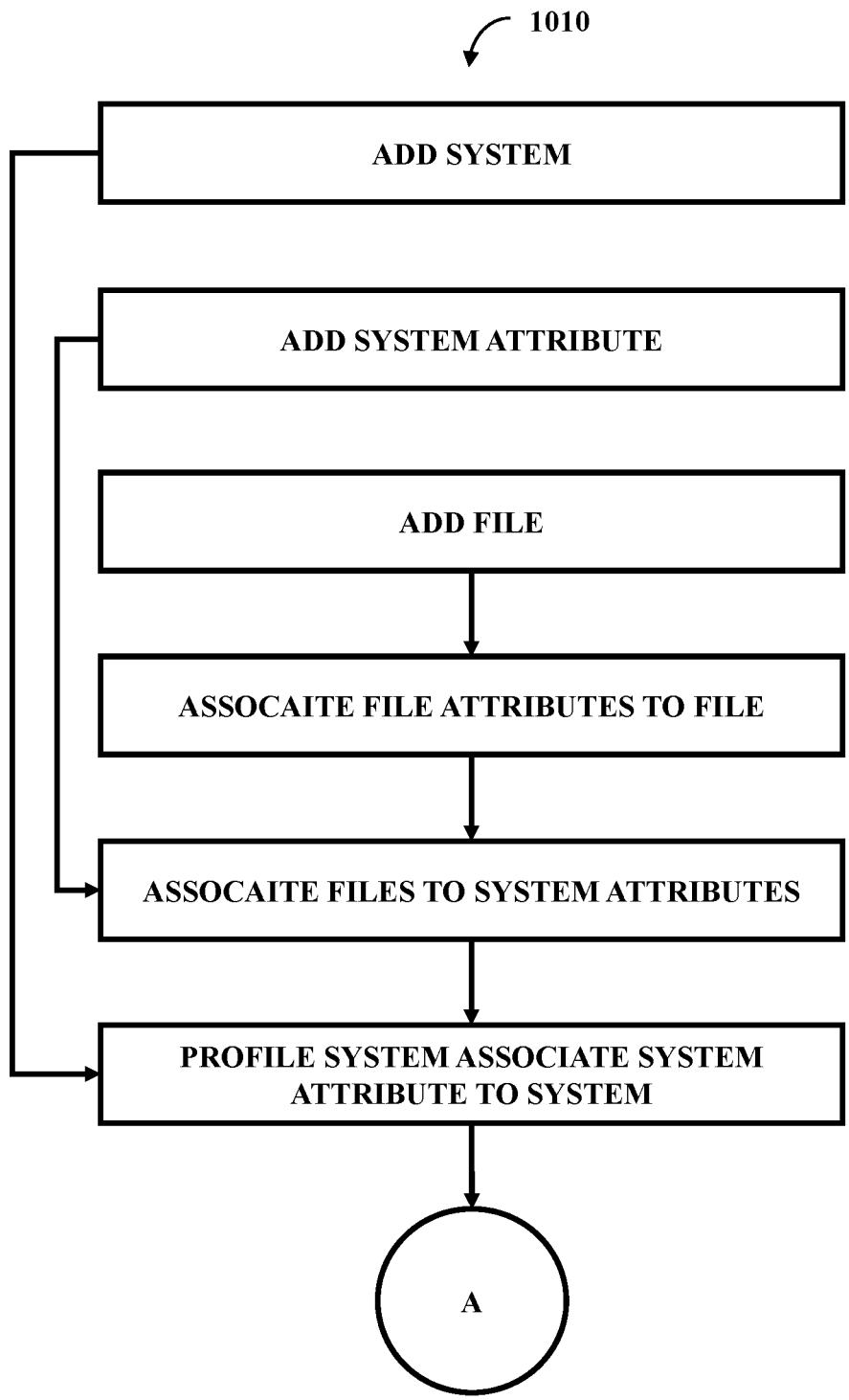
FIG. 10B illustrates one embodiment of an example implementation of the first action.

At 1010, a first action, there can be generating of a profile that describes a system. This can include, as illustrated in FIG. 10B for the first action 1010, adding a file, adding the system, adding system attributes, associating a file attribute to a file, associating a file(s) to system attributes, and/or associating a profile system associate system attribute to the system. In one example, a user can use a web guided user interface that allows the user to add a system for evaluating and identify pertinent information for that system. As part of this, the user can tag the system with attributes that make up the profile. These attributes can have files associated to them and therefore allow a system to inherit those files through its attributes. These attributes can include information such as assets, operating systems, features, and applications installed or configured in the system.

Figure 10C:
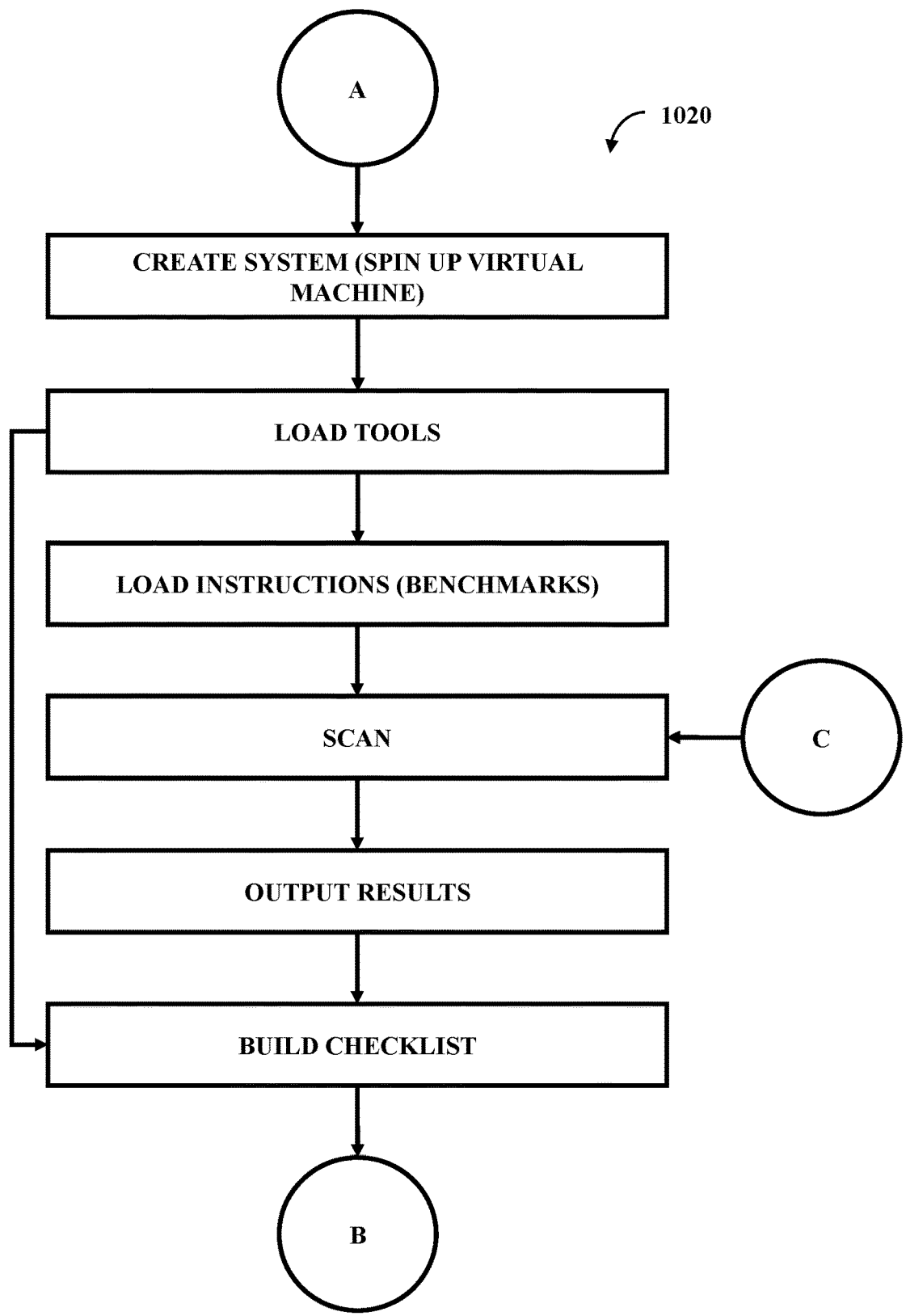
FIG. 10C illustrates one embodiment of an example implementation of the second action.

At 1020, a second action, there can be assessing vulnerability. This can include, as illustrated in FIG. 10C for the second action 1020, creating virtual machine, loading tools, building a checklist based on the profile, loading instructions (e.g., benchmarks), performing a scan, and outputting results. Based on the profile, assessment can be achieved by launching a relevant Virtual Machine (VM) and loading the tools appropriate to scan the machine with instructions or benchmarks. A checklist determining vulnerabilities of the system can be built using output results from scans driven by the instructions or benchmarks.

Figure 10D:
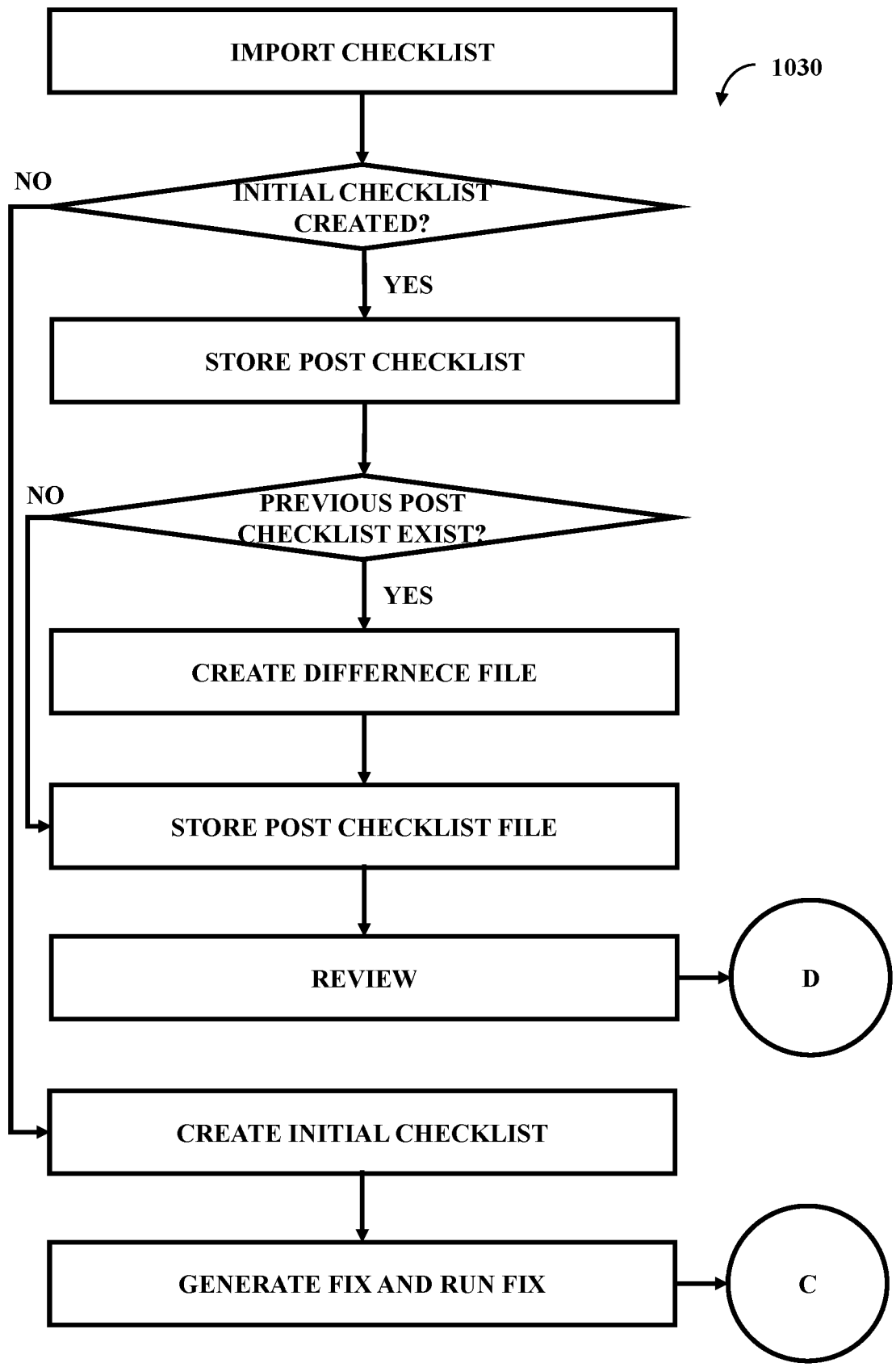
FIG. 10D illustrates one embodiment of an example implementation of the third action.
Figure 10E:
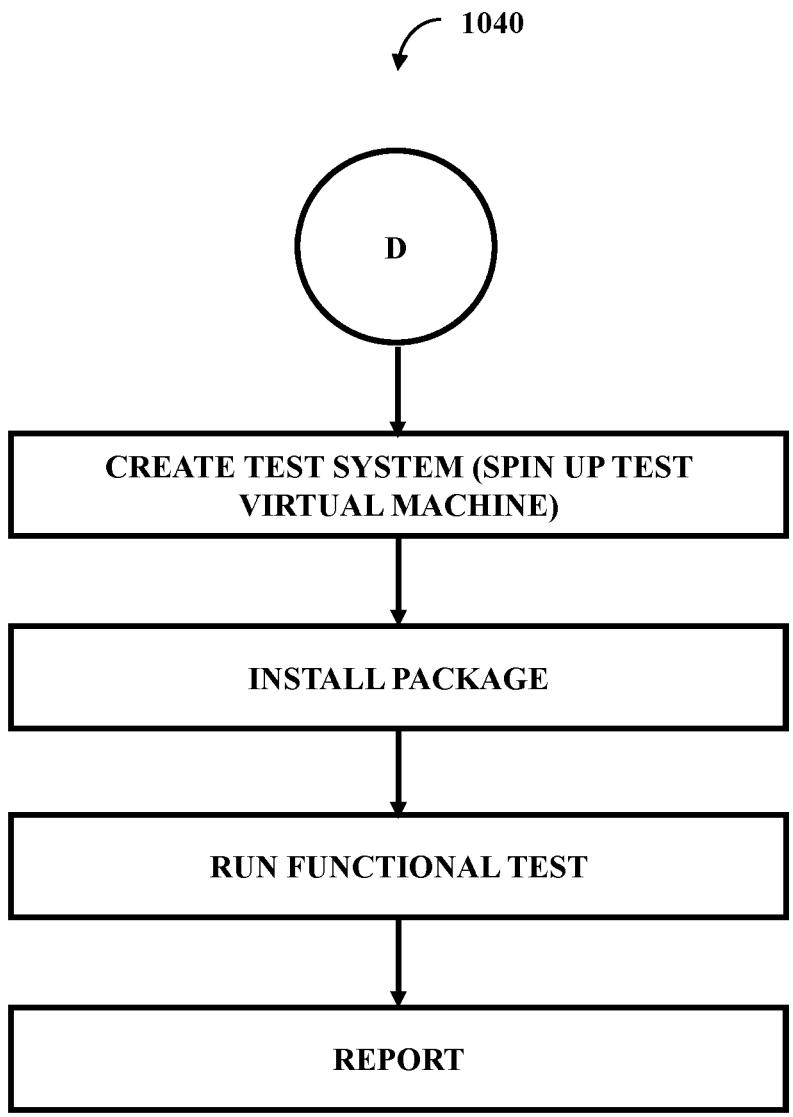
FIG. 10E illustrates one embodiment of an example implementation of the fourth action.

At 1030, a third action, there can be mitigating vulnerability. This can include, as illustrated in FIG. 10D for the third action 1030, importing a checklist, determining if an initial checklist is created, storing a post checklist, determining if a previous post checklist exists, creating a difference file, storing the post checklist, reviewing, creating an initial checklist, generating a fix, and running the fix. For mitigation, an apparatus (e.g., the system 600 of FIG. 6 practicing aspects disclosed herein) can ingest the checklist and create an initial checklist and mitigation script based on known fixes that are stored in a central database (e.g., the database 550 of FIG. 5). The apparatus can apply the script to the VM and rescan. This can generate a post checklist that is sent to review. Systems with a prior post checklist can generate an additional differential file that is also used for review At 1040, a fourth action, there can be testing following mitigation. This can include, as illustrated in FIG. 10D for the fourth action 1040, creating a test system, installing a package, running a functional test, and reporting the results. Based on an acceptance threshold, systems that pass review can be queued for testing. A separate test VM can spun up and the installation package is applied. Relevant functional tests are ran based on the profile and a report is generated. If the threshold is not met, then the appropriate action can be taken (e.g., producing an error message or attempting a different mitigation).

While the methods disclosed herein are shown and described as a series of blocks, it is to be appreciated by one of ordinary skill in the art that the methods are not restricted by the order of the blocks, as some blocks can take place in different orders.

It is to be appreciated by one of ordinary skill in the art that aspects disclosed herein can be practiced in different configurations. While the personal computer/tablet/smart phone example is provided, aspects can be practiced in other areas. Examples include weapons systems, radar systems, or industrial automation.

Also, while simple mitigation and vulnerability relationships are discussed, it is to be appreciated by one of ordinary skill in the art that much more complex relationships can occur. For example, a vulnerability can have more than one mitigation function. In this example, one mitigation can be superior to the other—so a first function is more secure of a correction than a second function. The first function can be implemented and tested. If desired functionality is not achieved, then the first function can be un-implemented and the second function can be implemented and tested. If desired functionality is achieved, then the second mitigation function can be instituted and deployed. Other complexities that can be addressed by aspects disclosed herein can include daisy chain mitigation (e.g., mitigation causes a new/different vulnerability that is then mitigated) or updating mitigation (e.g., new information causes the second function to now be superior to the first).

What is claimed is:
1. A processor, communicatively coupled to a non-transitory computer-readable medium, configured to execute a command set retained upon the non-transitory computer-readable medium to perform a method, the method comprising:
  performing a first vulnerability assessment on a first system based, at least in part, on a profile of the first system to produce a first vulnerability list;
  identifying a first mitigation task list for the first system based, at least in part, on the first vulnerability assessment;
  causing the first mitigation task list to be performed upon the first system;
  evaluating the first system post-performance of the first mitigation task list to produce a first evaluation result;
  causing output of a first report based, at least in part, on the first evaluation result;
  performing a second vulnerability assessment on a second system based, at least in part, on a profile of the second system to produce a second vulnerability list;
  identifying a second mitigation task list for the second system based, at least in part, on the second vulnerability assessment;
  causing the second mitigation task list to be performed upon the second system;
  evaluating the second system post-performance of the second mitigation task list to produce a second evaluation result; and
  causing output of a second report based, at least in part, on the second evaluation result,
  where the first system and the second system are separate and distinct systems,
  where the first vulnerability list and the second vulnerability list share a common vulnerability item,
  where the first mitigation task list and the second mitigation task list share a common mitigation item to mitigate the common vulnerability item,
  where performing the first vulnerability assessment, identifying the first mitigation task list, causing the first mitigation task list to be performed, evaluating the first system post-performance, and causing output of the first report occur within a first time span,
  where performing the second vulnerability assessment, identifying the second mitigation task list, causing the second mitigation task list to be performed, evaluating the second system post-performance, and causing output of the second report occur within a second time span, where the second time span follows the first time span, and where the first time span and the second time span do not overlap.

2. The processor of claim 1, where the first vulnerability list comprises a vulnerability item not found in the second vulnerability list and where the first mitigation task list comprises a mitigation item not found in the second mitigation task list.

3. The processor of claim 2, where the second vulnerability list comprises a vulnerability item not found in the first vulnerability list and where the second mitigation task list comprises a mitigation item not found in the first mitigation task list.

4. The processor of claim 1, the method comprising:

analyzing the first report to produce an analysis result that indicates a particular vulnerability item that is not successfully mitigated as a result of the first mitigation task list; and producing a solution for the particular vulnerability item based, at least in part, on the analysis result, where the second vulnerability assessment comprises the particular vulnerability item, where the second mitigation task list comprises the solution, and where the second report indicates the particular vulnerability item being mitigated for the second system.

5. The processor of claim 1, the method comprising:

assessing attributes of the first system to produce a first assessment result;

creating the profile of the first system based, at least in part, on the first assessment result;

assessing attributes of the second system to produce a second assessment result;

creating the profile of the second system based, at least in part, on the second assessment result;

searching, in view of the first vulnerability assessment, a database that associates individual vulnerabilities with individual mitigation tasks to identify the first mitigation task list; and searching, in view of the second vulnerability assessment, the database that associates individual vulnerabilities with individual mitigation tasks to identify the second mitigation task list.

6. A non-transitory computer-readable medium, communicatively coupled to a processor, configured to store a command set executable by the processor such that a method is performed, the method comprising:

performing a first vulnerability assessment on a first system based, at least in part, on a profile of the first system to produce a first vulnerability list;

identifying a first mitigation task list for the first system based, at least in part, on the first vulnerability assessment;

causing the first mitigation task list to be performed upon the first system;

evaluating the first system post-performance of the first mitigation task list to produce a first evaluation result;

causing output of a first report based, at least in part, on the first evaluation result;

performing a second vulnerability assessment on a second system based, at least in part, on a profile of the second system to produce a second vulnerability list;

identifying a second mitigation task list for the second system based, at least in part, on the second vulnerability assessment;

causing the second mitigation task list to be performed upon the second system;

evaluating the second system post-performance of the second mitigation task list to produce a second evaluation result; and causing output of a second report based, at least in part, on the second evaluation result, where the first system and the second system are separate and distinct systems, where the first vulnerability list and the second vulnerability list share a common vulnerability item, where the first mitigation task list and the second mitigation task list share a common mitigation item to mitigate the common vulnerability item, where performing the first vulnerability assessment, identifying the first mitigation task list, causing the first mitigation task list to be performed, evaluating the first system post-performance, and causing output of the first report occur within a first time span, where performing the second vulnerability assessment, identifying the second mitigation task list, causing the second mitigation task list to be performed, evaluating the second system post-performance, and causing output of the second report occur within a second time span, where the second time span follows the first time span, and where the first time span and the second time span do not overlap.

7. The non-transitory computer-readable medium of claim 6, where the first vulnerability list comprises a vulnerability item not found in the second vulnerability list and where the first mitigation task list comprises a mitigation item not found in the second mitigation task list.

8. The non-transitory computer-readable medium of claim 7, where the second vulnerability list comprises a vulnerability item not found in the first vulnerability list and where the second mitigation task list comprises a mitigation item not found in the first mitigation task list.

9. The non-transitory computer-readable medium of claim 6, the method comprising:

analyzing the first report to produce an analysis result that indicates a particular vulnerability item that is not successfully mitigated as a result of the first mitigation task list; and producing a solution for the particular vulnerability item based, at least in part, on the analysis result, where the second vulnerability assessment comprises the particular vulnerability item, where the second mitigation task list comprises the solution, and where the second report indicates the particular vulnerability item being mitigated for the second system.

10. The non-transitory computer-readable medium of claim 6, the method comprising:

assessing attributes of the first system to produce a first assessment result;

creating the profile of the first system based, at least in part, on the first assessment result;

assessing attributes of the second system to produce a second assessment result;

creating the profile of the second system based, at least in part, on the second assessment result;

searching, in view of the first vulnerability assessment, a database that associates individual vulnerabilities with individual mitigation tasks to identify the first mitigation task list; and searching, in view of the second vulnerability assessment, the database that associates individual vulnerabilities with individual mitigation tasks to identify the second mitigation task list.

11. A system, comprising:

a processor; and a non-transitory computer-readable medium, communicatively coupled to the processor, configured to store a command set executable by the processor to facilitate operation of a component set, the component set comprising:

a first assessment component configured to perform a first vulnerability assessment on a first system based, at least in part, on a profile of the first system to produce a first vulnerability list;

a first identification component configured to identify a first mitigation task list for the first system based, at least in part, on the first vulnerability assessment;

a first causation component configured to cause the first mitigation task list to be performed upon the first system;

a first evaluation component configured to evaluate the first system post-performance of the first mitigation task list to produce a first evaluation result;

a second causation component configured to cause output of a first report based, at least in part, on the first evaluation result;

a second assessment component configured to perform a second vulnerability assessment on a second system based, at least in part, on a profile of the second system to produce a second vulnerability list;

a second identification component configured to identify a second mitigation task list for the second system based, at least in part, on the second vulnerability assessment;

a third causation component configured to cause the second mitigation task list to be performed upon the second system;

a second evaluation component configured to evaluate the second system post-performance of the second mitigation task list to produce a second evaluation result; and a fourth causation component configured to cause output of a second report based, at least in part, on the second evaluation result, where the first system and the second system are separate and distinct systems, where the first vulnerability list and the second vulnerability list share a common vulnerability item, where the first mitigation task list and the second mitigation task list share a common mitigation item to mitigate the common vulnerability item, where performing the first vulnerability assessment, identifying the first mitigation task list, causing the first mitigation task list to be performed, evaluating the first system post-performance, and causing output of the first report occur within a first time span, where performing the second vulnerability assessment, identifying the second mitigation task list, causing the second mitigation task list to be performed, evaluating the second system post-performance, and causing output of the second report occur within a second time span, where the second time span follows the first time span, and where the first time span and the second time span do not overlap.

12. The system of claim 11, where the first vulnerability list comprises a vulnerability item not found in the second vulnerability list and where the first mitigation task list comprises a mitigation item not found in the second mitigation task list.

13. The system of claim 12, where the second vulnerability list comprises a vulnerability item not found in the first vulnerability list and where the second mitigation task list comprises a mitigation item not found in the first mitigation task list.

14. The system of claim 11, the component set comprising:

an analysis component configured to analyze the first report to produce an analysis result that indicates a particular vulnerability item that is not successfully mitigated as a result of the first mitigation task list; and a solution component configured to produce a solution for the particular vulnerability item based, at least in part, on the analysis result, where the second vulnerability assessment comprises the particular vulnerability item, where the second mitigation task list comprises the solution, and where the second report indicates the particular vulnerability item being mitigated for the second system.

15. The system of claim 11, the component set comprising:

a first attribute component configured to assess attributes of the first system to produce a first assessment result;

a first profile component configured to create the profile of the first system based, at least in part, on the first assessment result;

a second attribute component configured to assess attributes of the second system to produce a second assessment result;

a second profile component configured to create the profile of the second system based, at least in part, on the second assessment result;

a first search component configured to search, in view of the first vulnerability assessment, a database that associates individual vulnerabilities with individual mitigation tasks to identify the first mitigation task list; and a second search component configured to search, in view of the second vulnerability assessment, the database that associates individual vulnerabilities with individual mitigation tasks to identify the second mitigation task list.

* * * * *